(12) United States Patent
Schultz et al.

(10) Patent No.: US 10,035,390 B1
(45) Date of Patent: Jul. 31, 2018

(54) HIGH VISIBILITY SAFETY STRAP AND METHODS FOR SECURING A TRAILER TO A TOWING VEHICLE

(71) Applicants: John G. Schultz, Issaquah, WA (US); Denise S. O'Daniel, Issaquah, WA (US)

(72) Inventors: John G. Schultz, Issaquah, WA (US); Denise S. O'Daniel, Issaquah, WA (US)

(*) Notice: Subject to any disclaimer, the term of this patent is extended or adjusted under 35 U.S.C. 154(b) by 0 days.

(21) Appl. No.: 15/410,055

(22) Filed: Jan. 19, 2017

(51) Int. Cl.
*B60D 1/18* (2006.01)
*B60D 1/58* (2006.01)
*B60D 1/24* (2006.01)

(52) U.S. Cl.
CPC ............ *B60D 1/182* (2013.01); *B60D 1/187* (2013.01); *B60D 1/24* (2013.01); *B60D 1/58* (2013.01)

(58) Field of Classification Search
CPC ............ B60D 1/18; B60D 1/182; B60D 1/28
See application file for complete search history.

(56) References Cited

U.S. PATENT DOCUMENTS

| | | | | |
|---|---|---|---|---|
| 4,087,008 A * | 5/1978 | Silva, Jr. | ................ | B60P 3/127 280/448 |
| 6,336,683 B1 | 1/2002 | Akiba | | |
| 6,772,711 B2 | 8/2004 | Morgan | | |
| 7,008,088 B2 * | 3/2006 | Pisciotti | ................ | B60Q 1/305 362/485 |
| 7,011,418 B2 | 3/2006 | Adams | | |
| 7,364,315 B2 | 4/2008 | Chien | | |
| 7,614,608 B1 * | 11/2009 | Ebbenga | ................ | B66D 1/04 254/278 |
| 7,752,991 B2 * | 7/2010 | Graves | ................ | B60Q 7/02 116/28 R |
| 7,806,483 B2 | 10/2010 | Schultz | | |
| 8,707,595 B2 | 4/2014 | Beemsterboer et al. | | |
| 8,726,467 B1 | 5/2014 | Smith | | |
| 9,731,567 B1 * | 8/2017 | Schultz | ................ | B60D 1/28 |
| 2016/0129742 A1 * | 5/2016 | Erickson | ................ | B60D 1/58 280/400 |
| 2016/0367845 A1 | 12/2016 | Bouquier | | |

OTHER PUBLICATIONS

Office Action dated Feb. 8, 2017 from related U.S. Appl. No. 15/175,405, filed Jun. 7, 2016, 7 pages.

* cited by examiner

*Primary Examiner* — Kevin Hurley
(74) *Attorney, Agent, or Firm* — Ryan Kromholz & Manion, S.C.

(57) ABSTRACT

A high visibility detachable safety strap is disclosed. The re detachable tractable safety strap is coupled to a coupling assembly, for instance a tongue, between the trailer and the towing vehicle. The high visibility nature of the strap increases safety for other motorists by making the presence of the coupling between the trailer and towing vehicle more perceivable. A preferably flexible structural support system carries the straps.

3 Claims, 3 Drawing Sheets

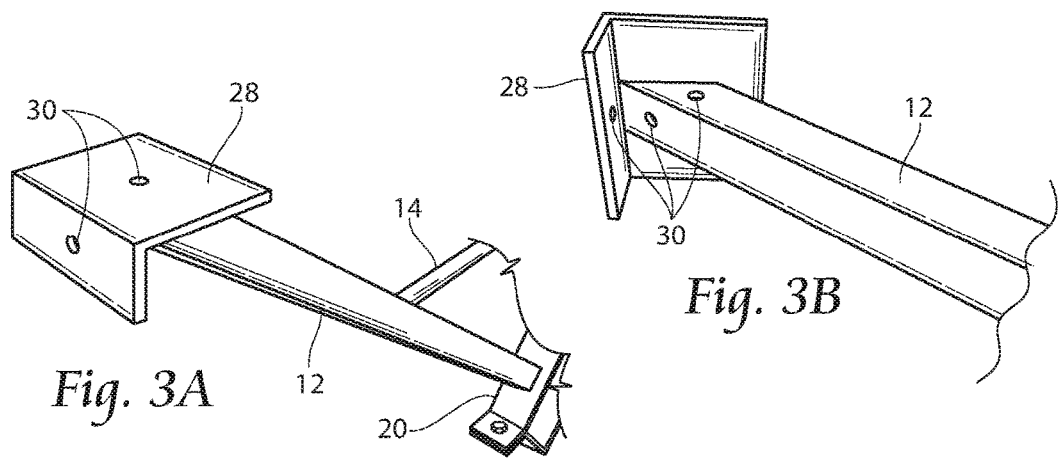
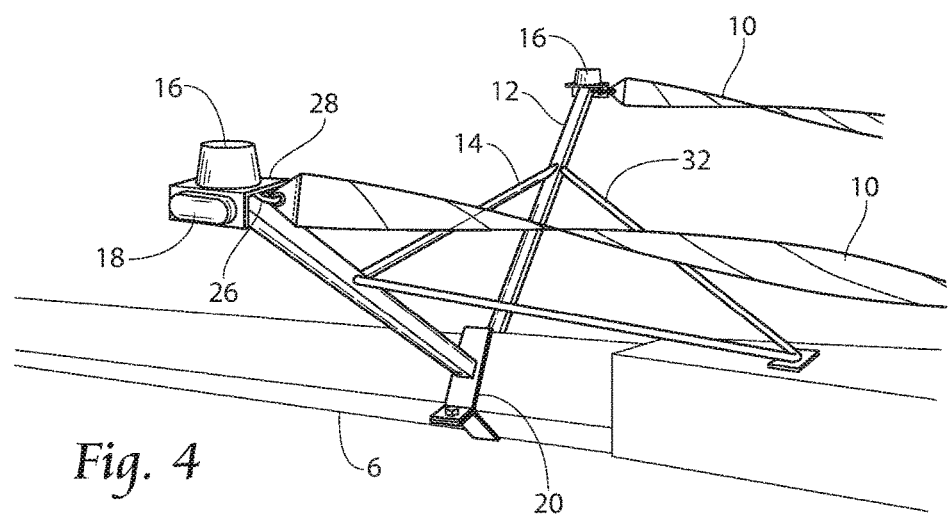
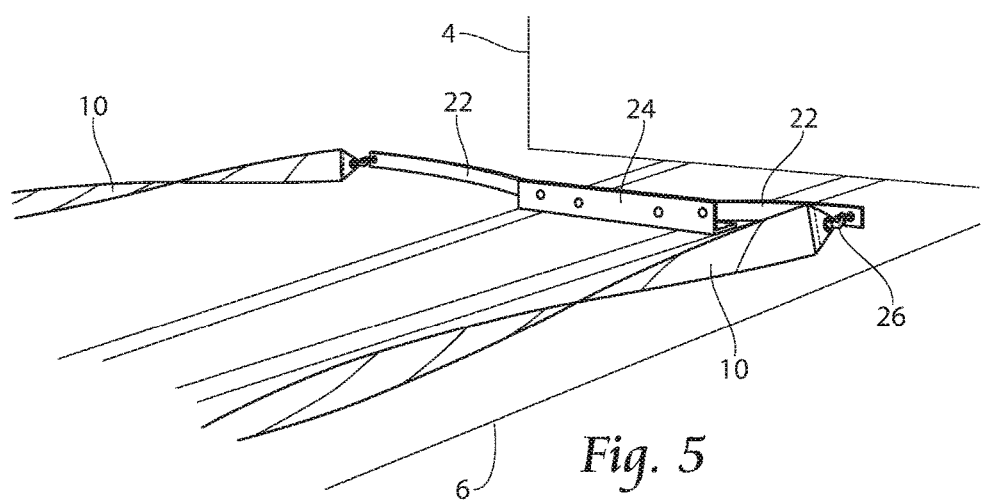

HIGH VISIBILITY SAFETY STRAP AND METHODS FOR SECURING A TRAILER TO A TOWING VEHICLE

BACKGROUND OF THE INVENTION

The present invention relates to an improved method of securing trailers to the vehicle that is towing the trailer.

Frequently, a commercial truck-trailer tows a second semi-trailer which is referred to as a "pup trailer." Pup trailers are commonly towed by a towing vehicle such as a dump truck where permitted by motor vehicle regulations. These types of trailers are used to increase the effective payload capacity of a single dump truck to allow a single motor vehicle to tow more payload than it ordinarily could.

Trucks of this type can extend and shrink the distance between the truck and pup-trailer by a switch in the cab of the truck. The connection between the truck and trailer can be shorter at the jobsite for maneuverability, and longer when over-the-road to spread the payload to decrease pressure on roads.

Drivers of other vehicles often have difficulty in seeing the pup trailer following the towing truck, or have difficulty is seeing the coupling or tongue that couples the towing vehicle with the pup trailer. This could create dangerous conditions, particularly regarding pup trailers that have a long coupling. Drivers who do not see the coupling could potentially merge into the coupling during lane change maneuvers.

SUMMARY OF THE INVENTION

A high visibility detachable safety strap, a structure for carrying said safety strap on a trailer tongue, and a method for securing a trailer to a towing vehicle are all disclosed. The detachable safety strap is coupled to a structure carried by a tongue ordinarily coupled to the trailer, and the towing vehicle. The high visibility nature of the strap increases safety for other motorists by making the presence of the coupling between the trailer and towing vehicle more perceivable.

BRIEF DESCRIPTION OF THE DRAWINGS

FIG. 3A is a top perspective view, with portions broken away, of a forward arm assembly carrying a light bracket;

FIG. 3B is a bottom perspective view, with portions broken away, of a forward arm assembly carrying a light bracket;

FIG. 4 is a perspective view of a forward arm assembly and an optional diagonal bracing system;

FIG. 5 is a perspective view of a rear portion of a safety strap system and flexible rear arm limbs carried by a rear arm support bar;

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
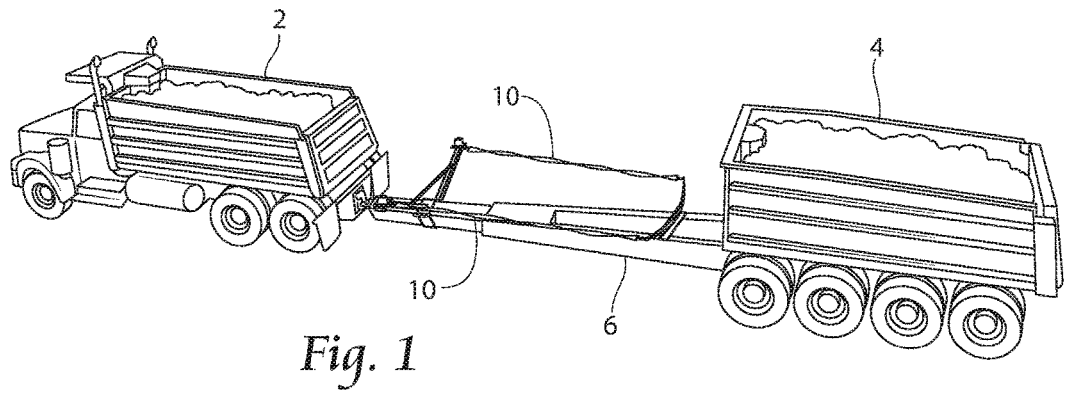
FIG. 1 is a perspective view of a towing vehicle, a pup trailer carrying a tongue, and a safety strap system carried by said tongue.

Referring now to FIG. 1, a towing vehicle 2 is shown towing a pup trailer 4 by means of a coupling 6. Often the coupling or tongue (which can also be referred to as a drawbar) 6 between the trailer 4 and towing vehicle 2 is below eye-level and sight level for passing vehicles, so its presence is difficult to perceive, and often times dangerous.

To aid in identifying the presence of the tongue 6, one or more straps 10 can be provided, as described in U.S. Pat. No. 7,806,483 incorporated herein by reference.

Figure 2:
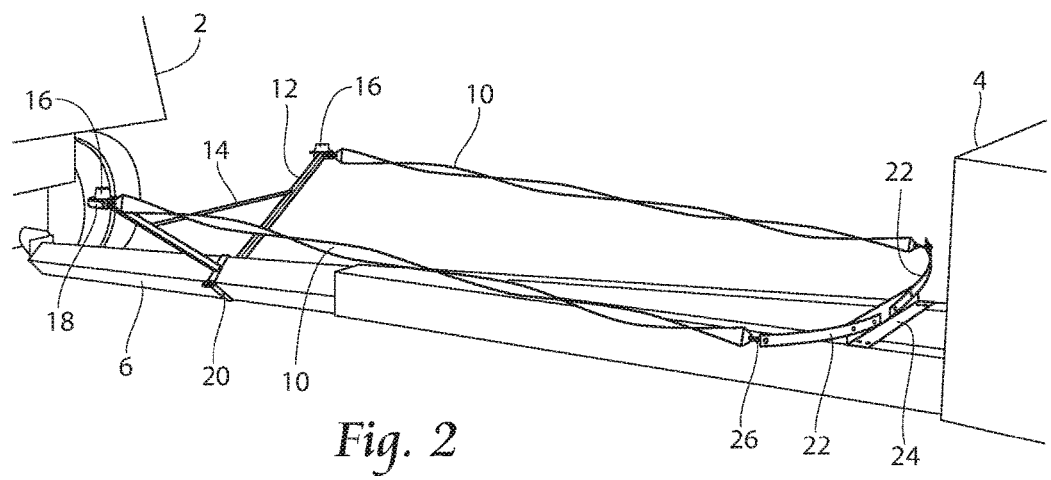
FIG. 2 is a closer perspective view of the safety strap system of the present invention.

Referring now to FIG. 2, a perspective view of the towing vehicle 2, coupling 6 and straps 10 of the present invention are shown. In this view, it is apparent that the straps 10 effectively assist passing vehicles with viewing the coupling 6, and to some extent providing a barrier to prevent vehicles from merging into the coupling 6.

Safety straps 10 are shown coupled between the towing vehicle 2 and the pup trailer 4. It is preferable to provide two safety straps 10, both at a left and a right lateral extent of the towing vehicle 2, and also preferably at about eye-level for passing vehicles. Preferably straps 10 are constructed or covered by a high visibility and/or fluorescent or illuminated material, such as reflective or brightly colored fabric or tape. The high visibility nature of the straps 10 increases safety for other motorists by making the presence of the coupling 6 between the trailer 4 and towing vehicle 2 more perceivable.

Figure 3:
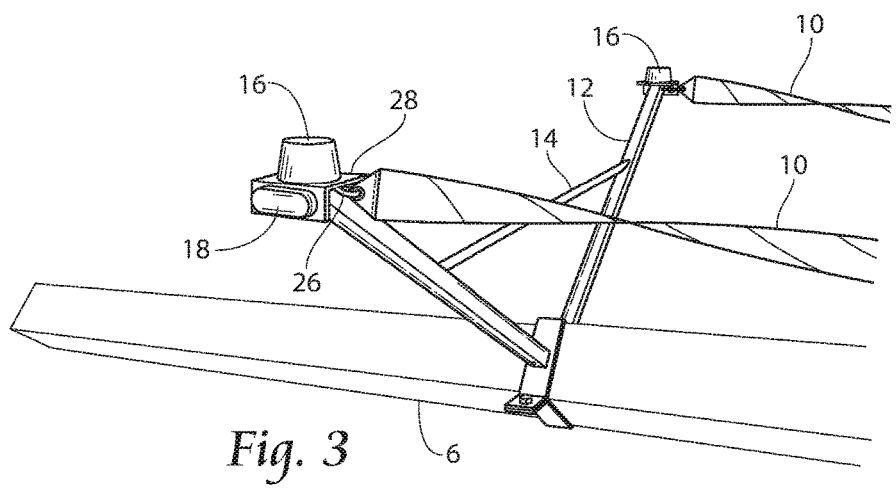
FIG. 3 is a close up view of a front portion of the safety strap system carried by a trailer tongue.

Still referring to FIG. 2, straps 10 are carried preferably on top of tongue 6. For this purpose a pair of forward arm assemblies 12 extend upwards and laterally from a front portion of tongue 6. Formed assembly support bars 20 carry forward arm assemblies 12, and are coupled (for instance by bolting as shown in FIG. 3) about a periphery of tongue 6. A forward arm assembly crossbar 14 connects and provides stability to forward arm assemblies 12. In a preferred embodiment, position lights 16 and or strobe lights 18 are carried by forward arm assemblies 12. Strap hooks 26 are provided at a front portion (see, e.g., FIG. 3) and a rear portion of straps 10 (which are shown in a preferred twisted configuration, see e.g., U.S. patent application Ser. No. 15/175,405 incorporated herein by reference) for coupling straps 10 both to forward arm assemblies 12 and a pair of rear arm limbs 22. Rear arm limbs 22 are coupled to a rearward portion of tongue 6 by a rear arm support bar 24 coupled to tongue 6.

Referring now to FIG. 3A, a top perspective view, with portions broken away, of a forward arm assembly carrying a light bracket;

FIG. 3B is a bottom perspective view, with portions broken away, of a forward arm assembly 12 carrying a light bracket 28. Light bracket 28 can be equipped with holes for position light 16 and strobe light 18 wiring and securement to bracket 28. Additionally, holes 30 in support arm 12 underneath light bracket 28, as shown in FIG. 3B, can be used for receiving s-hooks 26 as shown in FIG. 4.

Still referring to FIG. 4, an optional diagonal bracing system 32 can be used to additionally structurally support forward arm assemblies 12, and for additional coupling to tongue 6 if desired.

Referring now to FIG. 5, a perspective view of a rear portion of a safety strap system and flexible rear arm limbs 22 carried by a rear arm support bar 24, in turn carried by tongue 6 is shown. Straps 10 are preferably held in tension by flexible rear arm limbs 22, because the forward arm assembly 12 and rear arm limbs 22 are fixed to the trailer 6, such that in a preferred embodiment, the straps 10 are not required to change length while the vehicle turns corners. Furthermore, rear arm limbs 22 are designed to be preferably flexible, to assist in maintaining tautness in straps 10, and also to allow for the distance between towing vehicle 2 and trailer 6 to be varied, for instance be retracting or extending tongue 6. However, in a preferred embodiment, drawbar extension and retraction occurs forward of the forward arm assembly 12, so extending and retracting the drawbar 6 does not necessarily affect the tension of safety straps 10. Forward arm assemblies 12 could alternatively or additionally be flexible to serve these purposes. In an alternative embodiment of the present invention straps 10 can be made of an elastomeric material as opposed to, or in addition to, being detachable. Springs (not shown) can also be provided at a leading or trailing end of straps 10 to provide tensioning/stretching capabilities.

Figure 6:
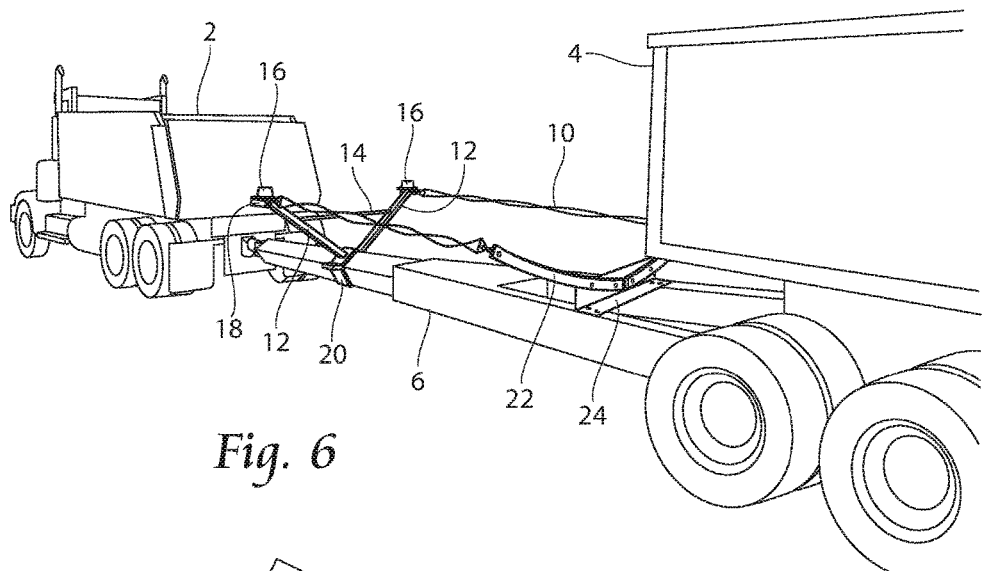
FIG. 6 is a rear perspective view of a strap system installed on a vehicle towing a trailer.
Figure 7:
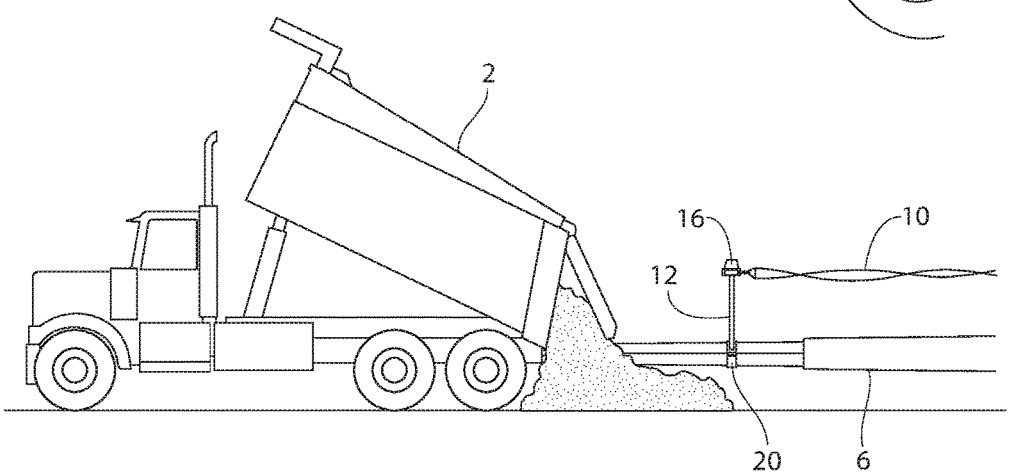
FIG. 7 is a side view of the towing vehicle dumping a load about tongue 6 in front of safety strap system forward arm assemblies.

Referring now to FIG. 6, a rear perspective view of a strap system installed on a vehicle 2 towing a trailer 4 is shown in trailering use. After reaching its destination, a vehicle 2 can dump a load about tongue 6 in front of safety strap system forward arm assemblies 12 as shown in FIG. 7.

In another alternative embodiment of the present invention, lighting, such as fiber optic lighting, can be either imbedded in or carried by the straps 10.

Figure 8:
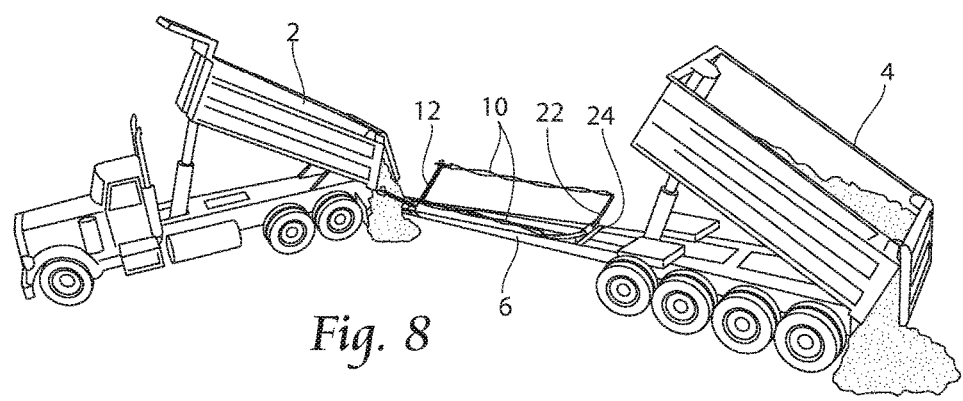
FIG. 8 is a rear perspective view of a strap system installed on a vehicle towing a trailer, with a dump truck in a load deposition position.

Referring now to FIG. 8, a rear perspective view of a strap system installed on vehicle 10 towing a trailer 4 is shown, vehicle 10 in a load deposition position, with a forward portion of its dump bed raised to allow gravity to feed and deposit carried materials from the bed. In a preferred embodiment, during load dumping, straps 10 do not interfere with operation of the dump truck or the dumping function of the associated pup trailer 4.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A safety strap system between a towing vehicle and a trailer being towed by said towing vehicle, said safety strap system comprising:
    a forward arm assembly coupled to a coupling extending between said towing vehicle and said trailer;
    a rear arm assembly coupled to said coupling;
    a strap coupled between said forward arm assembly and said rear arm assembly;
    said safety strap system further comprising at least one of a position light and a strobe light carried by said forward arm assembly.

2. A safety strap system between a towing vehicle and a trailer being towed by said towing vehicle, said safety strap system comprising:
    a forward arm assembly coupled to a coupling extending between said towing vehicle and said trailer;
    a rear arm assembly coupled to said coupling;
    a strap coupled between said forward arm assembly and said rear arm assembly;
    said rear arm assembly comprising a pair of flexible limbs carried by a rear arm support bar coupled to said tongue.

3. A safety strap system between a towing vehicle and a trailer being towed by said towing vehicle, said safety strap system comprising;
    a forward arm assembly coupled to a coupling extending between said towing vehicle and said trailer;
    a rear arm assembly coupled to said coupling;
    a strap coupled between said forward arm assembly and said rear arm assembly;
    said forward arm assembly comprising a pair of arms extending outwardly and upwardly from said coupling.

* * * * *